Dec. 1, 1936. G. M. EATON 2,062,407
JOINT
Filed Feb. 19, 1935 5 Sheets-Sheet 2

Dec. 1, 1936.  G. M. EATON  2,062,407
JOINT
Filed Feb. 19, 1935  5 Sheets-Sheet 3

INVENTOR.
George M. Eaton
BY Brown, Critchlow + Rick
his ATTORNEYS.

Dec. 1, 1936.   G. M. EATON   2,062,407
JOINT
Filed Feb. 19, 1935    5 Sheets-Sheet 4

WITNESSES
A B Wallace
A H Oldham

INVENTOR.
George M. Eaton
BY Brown, Critchlow, Flick
his ATTORNEYS.

Dec. 1, 1936.                G. M. EATON                2,062,407
                                JOINT
                          Filed Feb. 19, 1935        5 Sheets-Sheet 5

WITNESSES                                           INVENTOR.
A.B.Wallace.                                        George M. Eaton
A.H.Oldham                            BY            Brown, Critchlow & Hick
                                                       his ATTORNEYS.

Patented Dec. 1, 1936

2,062,407

UNITED STATES PATENT OFFICE 2,062,407

JOINT

George M. Eaton, Pittsburgh, Pa., assignor to Spang, Chalfant & Company, Inc., Pittsburgh, Pa., a corporation of Pennsylvania Application February 19, 1935, Serial No. 7,212

13 Claims. (Cl. 285—146)

My invention relates generally to improved joints for securing together tubular members, and is directed more particularly to the shape and formation of the complementary threaded and sealing sections of the joint and to the efficiency of the joint.

The invention disclosed in Letters Patent No. 1,927,656, issued September 19, 1933, of which I was a co-inventor, relates to an improved form of the whole threaded length of a pipe joint, whereas this invention relates to improvements thereof, and more particularly to a specific type of thread and seal that may be successfully applied to the form of joint shown in said Letters Patent.

While the present invention is applicable broadly for use in joining pipes, couplings and the like, it is more directly concerned with securing together seamless steel pipe used for casing or lining oil wells. For many years much difficulty has attended the use of pipe for lining wells with many failures and undesirable practices occurring. It can be said safely that few more severe and trying conditions on pipe and pipe joints can be found than those normally encountered in casing an oil well.

The very severe circumstances in pipe use for casing oil wells are due largely to the following factors: (a) The great depth to which the wells are often run necessitates connecting a very long string of casing pipe together. This naturally means enormous weight which puts tremendous strains on the pipe and its couplings. (b) Occasional tendency of a well to get out of vertical or to curve due to unbalanced drill resistance, or the necessity to so drill the well, which imposes lateral bending forces on the pipe casing and its coupling joints. (c) Shock and wear on the casing due either to action of the drill string carried in the casing or due to driving and jarring tools for moving the casing. If casing walls are too thin the drill may wear through letting water or other foreign material in the well which ordinarily necessitates recasing or abandonment of the well. (d) Casing pipe wall sections can not be made too thick as this will require more metal and thus add to the inherent cost of casings. Nor is it advisable to employ pipe couplings for the well casing which add to the overall outside diameter thereof and thus necessitate a larger drill hole, or which interfere with flowing cement up around the outside of the casing in the final casing fixing operation after the well has been drilled. (e) It is important that the coupling means joining the drill casings together are leak-proof to prevent entrance of foreign material into the well casing or escape of pressure and material from within the casing, and that the joint efficiency in tension (defined as strength of joint divided by ultimate strength of pipe) be high so that casing failure will be largely reduced. (f) The very weight of the pipe casing sections makes it difficult to handle them separately and join them together without injuring the threads by which they are joined together. (g) Danger of turning up the threaded connections between the casing sections either too little or too far, resulting either in leakage due to under turning or in galling the joint from over turning, with resulting leakage, and when the galling is excessive a reduction of the axial strength of the joint occurs. (h) Tendency of threads in mating pipe sections to gall as well as flow plastically during turning up operation as hereafter more fully explained. (i) Perhaps the most difficult condition to which the casing is subjected is the necessity of resisting collapse under external hydrostatic pressure. This is usually the determining feature in the selection of wall thickness, and likewise determines the proportions of my joint to secure the necessary or desired joint efficiency.

In an attempt to solve some of the foregoing difficulties the American Petroleum Institute, hereinafter referred to as A. P. I., adopted standard well casing threads, and reference to A. P. I. threads in this specification is directed to those threads covered in A. P. I. standards No. 5—A. These standards are generally used throughout the oil fields of the world as a basis for threaded casing pipe joints. The A. P. I. standard casing thread is of the sharp V type, with a relatively flat taper of either ⅜" or ¾" per foot on the diameter, and with either 8 or 10 threads per inch.

The flat tapers of the A. P. I. casing threads result in a very small clearance between the inside diameter of the female member end and the outside diameter of the male member end.

The A. P. I. casing thread necessitates precision machining requirements. Among these may be mentioned pitch, taper, diameter, thread form and smoothness of flanks. Moreover, the functioning of the A. P. I. joint is interfered with by shaving, burning, waving, etc.

It has been found, accordingly, that the A. P. I. thread did not solve the aforementioned problems but even added others such as (a) stress concentration in the V threads of the A. P. I.

standard thread, (b) feather edges on the V threads of the A. P. I. which resulted directly in very undesirable galling and plastic flow of the threads, (c) very high precision requirements in machining, (d) susceptibleness to thread damage in handling, and (e) difficulty in mating or stabbing female and male portions of the pipes to be joined and danger of thread damage in this operation.

Prior to my present invention very little had been done on casing couplings to improve the ease and efficiency of assembling the same, except as disclosed in Patent No. 1,927,656 on which my present invention is an improvement. Heretofore the assembling operation took considerable of the drill operators' time both to insure proper stabbing without thread damage and to thereafter turn or tong up. Again the prior art is barren of any teaching to insure a flexible, positive, protected, non-galling, seal in a well casing coupling. Still again prior to my present invention little or no work has been done to provide a threaded joint having high efficiency and in which the threads would be free from galling. No methods of making well casing joints of uniform or desired efficiency have been suggested. These and other problems and difficulties, unsolved or untouched by the pipe industry or the patented art, are fully considered herein as will be evident as the description proceeds.

It is accordingly the general object of the present invention to avoid former difficulties of and incident to, and to improve upon, threaded joints for well casings and the like by the provision of a new and advantageous threaded joint construction.

Another general object of my invention is to provide a well casing joint having a uniform, desired efficiency and to provide a process for its manufacture.

Another object of the invention is to provide a string of well casing having joints of uniform efficiency over its entire length with this efficiency being of any predetermined desired figure.

The invention contemplates making circumferentially uniform joints of exactly controlled minimum external and maximum internal dimensions and with the joint surfaces streamlining into the pipe contour.

Other objects of my invention are to provide a threaded connection with complementary threads that are as free as possible from the precision requirements involved in machining, and are free from the V thread concentrations, etc., involved in A. P. I. standard pipe threads.

Other objects are to provide a thread which, as it comes from the machining operations, is free from feather edges, which is not readily susceptible to accidental damage in handling, and which will not gall destructively while being turned or tonged home.

Another object is to produce a thread in which, if incipient galling starts, there are ample clearance spaces in the immediate vicinity of all areas of load bearing engagement into which metal locally stressed beyond its elastic limit can flow plastically and thus avoid the building up of lump galls which are so destructive in A. P. I. threads.

Another object is to provide complementary threads in a threaded connection which have diametral stabbing clearance much larger than that existing in standard A. P. I. or other known casing joint threads.

Another object is to provide a thread capable of being used with a materially steeper taper than has been employed heretofore for casing threads.

Another object is to provide a threaded connection with complementary threads which are capable of withstanding heavy initial stabbing loads because such loads are distributed over a large number of sturdy flat topped threads. Sufficient radial overlap is moreover provided between the simultaneously engaging thread tips to take the stabbing load without damage to the thread, and thus there is avoided the detrimental scoring which produces galling under formerly known joint make-up conditions.

Another object is to provide threads which properly engage without the need for taking any of the particular precautions, such as lining up witness marks, that are necessary when engaging certain types of casing threads now on the market.

Another object is to provide a tubular member with a thread whose depth is as shallow as it is practical to make a thread on relatively thin wall tubes.

Other objects are to provide a thread which requires only a few turns between the stabbed position and the rope-tight position, and which necessitates a relatively few number of turns from the rope-tight position to the screwed-home position.

Another object is to provide a thread for a threaded connection with flat crests and roots parallel with the axis of said thread. The invention further contemplates employing a thread of a coarser pitch than has been used heretofore and with a considerable difference between the radii of successive threads.

Another object of my invention is to provide, in a tapered threaded pipe joint, conical sealing and aligning surfaces of an improved character.

Another object is the provision of means for assisting in aligning and stabbing the mating pipe members without scoring the sealing surfaces thereon.

Another object is the provision adjacent to the male seal of means for increasing and improving the distribution of the pressure between the male and female conical sealing surfaces and also to protect said male sealing surface from mechanical damage.

Again, my improved thread produces during the making-up of the joint a more rapidly increasing frictional resistance than the A. P. I. standard thread. This rapidly increasing frictional resistance inherently results in a total work of friction in making up the joint which is much less than that of A. P. I. standard casing joints.

Another object is to provide a threaded connection with a thread which is reliable after being made up repeatedly.

Another object is to produce a threaded pipe joint or the like in which axial stresses on the joint have a relatively small effect to radially expand the female portion of the joint and to radially contract the male portion of the joint.

Another object is to provide a threaded connection with a thread which, after it has been machined, is easily proven, as by simple gauging operations, to meet all the other objects noted. In standard A. P. I. casing threads it has been found exceedingly difficult to gauge the threads and thus determine their complete adequacy for the service.

The foregoing and other advantages and objects are achieved by the invention as set forth in the following description and illustrated in the accompanying drawings wherein.

Figure 9:
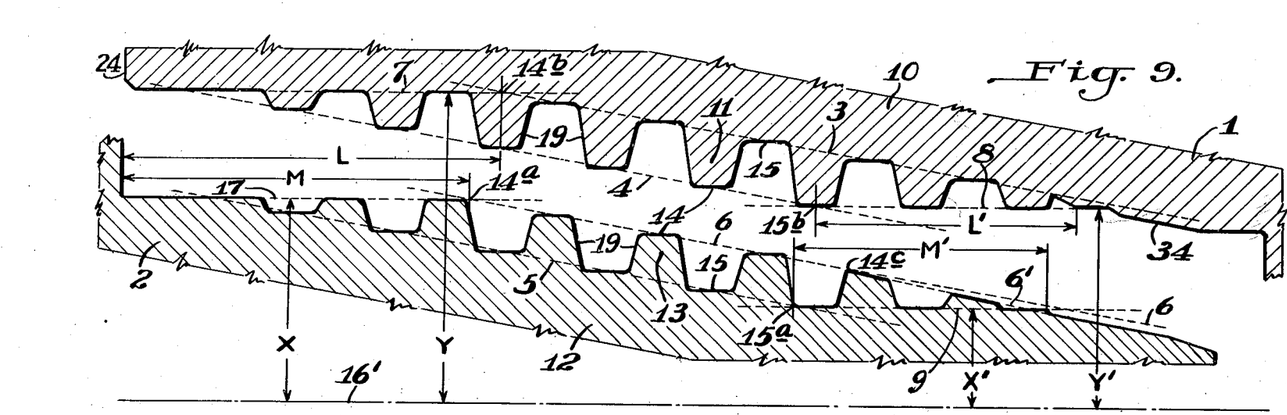
Fig. 9 is a fragmentary, longitudinal, schematic, sectional view of mating threaded pipe sections preferably used in the practice of the invention.

The principles of the invention can best be understod by first referring to Fig. 9 which diagrammatically illustrates the preferred form of my improved joint, and more particularly the relation of the threads formed on the mating parts thereof and the root and crest lines on which these threads are defined and constructed. The numeral 1 indicates generally a pipe section having a female mating portion 10, and the numeral 2 indicates generally a complementary pipe section having the male mating portion 12. Construction lines 3 and 4, formed parallel with the taper of the female member 10, define, respectively, the position of the mid-width of the roots and crests of threads 11 formed on these lines. In a like manner construction lines 5 and 6, formed parallel with the taper, define the mid-length of the root and crest lines, respectively, of threads 13 formed on the male member 12.

The thread crest and the thread root are referred to in this specification as being flat and parallel with the axis. Where this expression is used it means that the crest or root under discussion is generated by a line parallel with the axis.

From the showing in Fig. 9 it will be evident that the threads 11 and 13 are, speaking generally, of substantially the same height in the intermediate portion of the threaded joint but are adapted to taper off at a gradually reduced height based upon the following construction or generating lines. Thus at the point 14b and outwardly the roots of the threads 11 coincide with construction line 7 which is parallel to the axis 16' of the pipe. However, the crests of the threads whose roots are formed on the construction line 7 are defined by continuation of the tapered construction line 4 until this line meets the parallel line 7 at which point the threads disappear.

This reduction of the height of the female threads at the large end of the taper is adopted for the purpose of securing the greatest possible thickness of material at the outer end of the female body, to withstand the hoop stress incident to the making up of the joint, and to otherwise increase the general strength of the joint. The reduction of depth of the male threads at the small end of the taper is to increase the general strength of male end as well as to simplify machining operations.

Complementary to the threads 11 formed on the construction line 7 are the threads 13 on the large end of the male member. From the point 14a towards the large end of the male member 12, threads 13 have their crests formed on construction line 17 parallel to the axis of the pipe, but their roots are formed on a continuation of the tapered construction line 5. The distance X from the construction line 17 to the axis 16' of the pipe joint is, however, somewhat less than the distance Y between the construction line 7 and the axis 16'. It will accordingly be recognized that when the male and female members are joined together the crests of the threads 13 formed on the construction line 17 will not engage with the base or roots of threads 11 formed on construction line 7 of the female member 10, but that a clearance designated by the numeral 20b (Fig. 3) will be provided therebetween. There is no clearance, however, provided between the crests of the female threads and the roots of the male threads at the larger end of the thread as defined by construction lines 4 and 5. The crests of the female thread as defined by the construction line 4 are in hard engagement with the roots of the male thread as defined by the construction line 5, clear to the point where the male thread root vanishes on the cylinder 17. Due to elastic deflections, the crest of the female thread engages with the cylinder 17 for a short distance beyond the point at which the male thread root vanishes. The pressure of this engagement decreases rapidly at successive points more remote from the vanishing point of the male root and eventually reaches zero. Beyond the point of zero engaging pressure the crest of the female thread has progressively increased clearance from the cylinder 17 up to the point where the female crest vanishes on the cylinder 7.

Now, referring to the small end of the female member 10, it will be recognized that the threads 11 are tapered off almost but preferably not quite to a vanishing point in the same manner as the male threads 13 at the large end of the male member. In other words, construction line 8 on the female member, which intersects tapered line 4 at 15b, lies parallel to the joint axis 16' and this construction line defines the crests of the vanishing female threads 11. The roots of the vanishing female threads are defined, however, by the construction line 3 which lies on the joint taper. It will be seen from the drawings that the threads are preferably stopped short of the intersection of the converging lines 3 and 8.

Complementary with the vanishing female threads 11 at the small end of the female member are male threads 13 having their roots formed on the construction line 9 which is parallel to the axis 16' of the pipes and which intersects the tapered construction line 5 at 15a. The crests of the vanishing male threads 13 at the small end of the male pipe may be formed on the construction line 6 which coincides with the taper of the mating pipe sections. It will accordingly be recognized that the construction lines 8 and 9 are parallel to the axis 16', but preferably the distance Y' is slightly greater than the distance X' so that there is an adequate clearance 20a (Fig. 3) between the crests of the female threads and the roots of the male threads at the smaller end of the thread.

It has been found preferable, however, to vanish the male threads at the small end of the male member 12 on a somewhat sharper taper than the construction line 6. The sharper taper or construction line has been dotted in the figure of the drawings and given the numeral 6', and this line may intersect the construction line 6 at the point 14c shown in the drawings. This insures a relatively rapid vanishing of the male threads for the purpose of shortening the overall machined length of the joint. The crests of the threads lying on construction line 6' may if desired coincide with line 6' rather than being parallel with the axis 16' in order to simplify the threading tools.

The invention provides that the distance L' which is the length of construction line 8 forming the crests of the female threads shall be greater than the distance M' which is the length of the construction line 9 and which defines the roots of the vanishing male threads. This insures that the end of the male member 12 assembles in the female member 10 with proper clearance. At the other end of the joint the distance L is made greater than the distance M.

An important feature of the invention is the forming of all of the crests 14 and the roots 15 of the threads so that most of the longitudinally extending surface elements thereof are parallel to the axis 16' of the pipe joint or the individual pipes. Thus when, as stated above, the roots and crests of the threads are said to be defined by the tapered construction lines 3, 4, 5, and 6, it is meant that these tapered construction lines pass substantially through the same place, such as the center, of all roots and crests which are, as stated, parallel to the axis. This arrangement is clearly shown in Fig. 9.

It will be appreciated that Fig. 9 is not in scale but that the various angles, tapers, etc., are exaggerated to better exemplify the principles of the invention. In the practice of the invention the depth of threads 11 and 13 may be gradually reduced in both directions from a zone of maximum thread depth midway of the length of the threaded portions, while following curved construction lines which approximate as closely as possible the general construction lines as just described. However, the invention in its preferred form adheres closely to the construction lines described, and relies on the angle between the tapered and parallel lines to effect the vanishing or reduction of the thread. It will be seen that the various construction lines 3, 4, 7, and 8, and 5, 6, 9, and 17 form parallelograms having sides on the joint taper and sides parallel with the joint axis.

The taper of the sealing surfaces has been illustrated as being parallel to the taper of the threaded portions of my joint, which construction is preferred. However, if desired the sealing and thread tapers may be made somewhat different.

Reference should now be had to the sectional views of one embodiment of the invention illustrated in Figs. 1 to 8. In the particular form of the invention shown the taper of the threads, and thus the taper of construction lines 3, 4, 5, and 6 is preferably approximately one and one-quarter diametral inches per axial foot, and the number of threads per inch is preferably approximately six. The invention contemplates, however, employing any taper greater than three-quarter inch per foot, preferably between approximately one inch and approximately two inches per foot. In a like manner the number of threads per inch may be any number less than eight.

Figure 1:
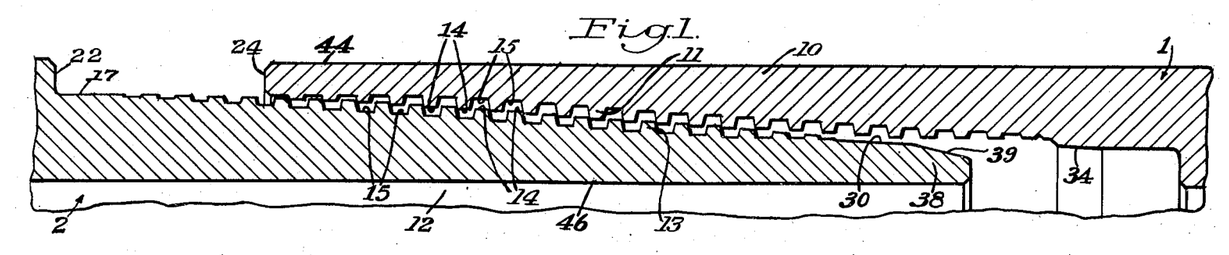
Fig. 1 is a longitudinal diametrical sectional view of a pipe joint embodying the principles of the invention with only one-half the joint being shown and the rest being broken away. The mating pipes and the thread thereon are illustrated in their relative positions at the close of a vertical stabbing operation preparatory to screwing the pipes together.
Figure 5:
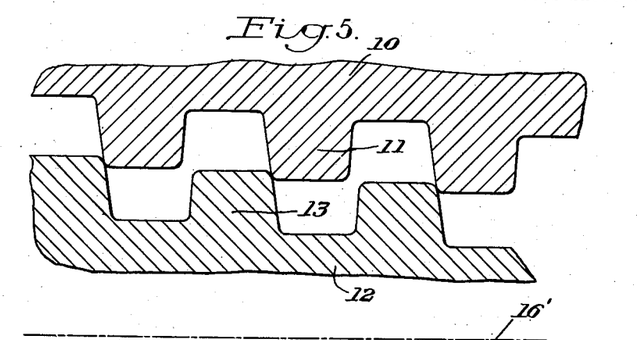
Fig. 5 is an enlarged longitudinal sectional view illustrating the relative positions of complementary threads after the mating pipes have been stabbed, the major portion of the pipes being broken away.

I have illustrated in Fig. 1 the relation of the parts after the initial mating or stabbing operation. Fig. 5 similarly illustrates, but in larger scale, the relation of the teeth of the mating pipe sections after this stabbing operation. It will be noted that by making the crests 14 of the threads parallel to the axis 16' of the pipe joint that in the stabbing operation the taper of the female and male portions causes the threads 11 and 13 to come together in the manner best seen in Fig. 5. Thus the thrust on the pipe sections as occasioned by the stabbing operation is transmitted between a plurality of the threads which engage with their shoulders at the various points seen in Fig. 5.

It will be noted that the corners of the thread tips are rounded off and that the corners of the thread roots are filleted in the usual manner.

Figure 7:
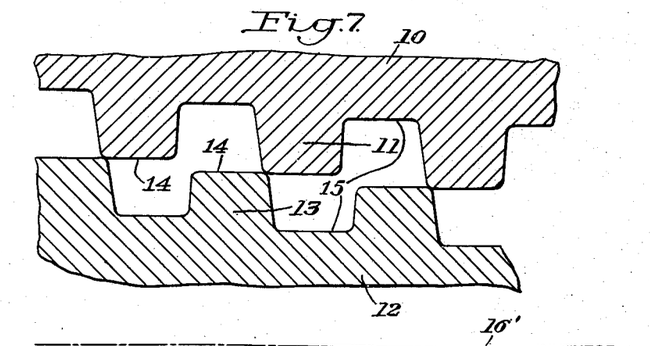
Fig. 7 is an enlarged fragmentary longitudinal section illustrating an occasionally encountered relative position of complementary threads designed in accordance with the invention when the male member is one thread pitch above actual stabbing engagement with the female member.

To better understand the stabbing operation, reference may be had to Fig. 7 which illustrates a possible relation of the complementary threaded portions just one thread above stabbing engagement. At this position the radial distance to the female thread crests is slightly greater than, or substantially the same as, the radial distance to the thread crests of the male member so that the female member 10 can slide relatively past the male member 12 which brings the threads to the shoulder-to-shoulder engaging position illustrated in Fig. 5. In certain rare instances the radial distance to the female crests may be a few thousandths of an inch smaller than the radial distance to the male crests to cause a force fit between the thread surfaces. The inherent weight of the pipe either causes the sufaces to slide by to the position illustrated in Fig. 5, or if this does not occur as soon as the tonging-up or turning-up operation of the pipe joint occurs the threads move into the position seen in Fig. 5.

Figure 6:
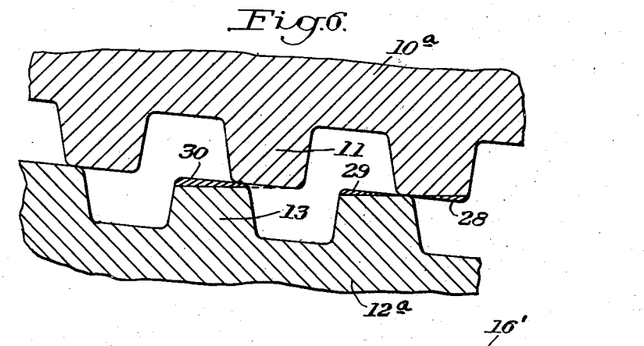
Fig. 6 is an enlarged fragmentary longitudinal sectional view illustrating an occasionally encountered relative position of stabbed mating pipes having complementary threads with crests and roots which are parallel with the mating taper, rather than parallel to the pipe axes as taught by the present invention.

Fig. 6 illustrates what is liable to occur in a threaded joint connection in which the threads have crests formed on a taper. In this figure the male member 12a has been moved into the female member 10a until engagement of the threads occurs. It will be recognized that continued movement of the sections together, either causes a portion 28 of the thread of the female member to be sheared off, with a corresponding portion 29 on the male thread being sheared off, or else one thread has all of the material sheared off as illustrated at 30 in the next adjacent thread. I have found that this shearing operation results when heavy pipe sections are stabbed together, and that it causes destruction or severe galling of the threads during the make-up of the joint. It is substantially impossible to take apart and make up the joint a plurality of times after this thread-shearing occurs.

Figures 10, 11, 12:
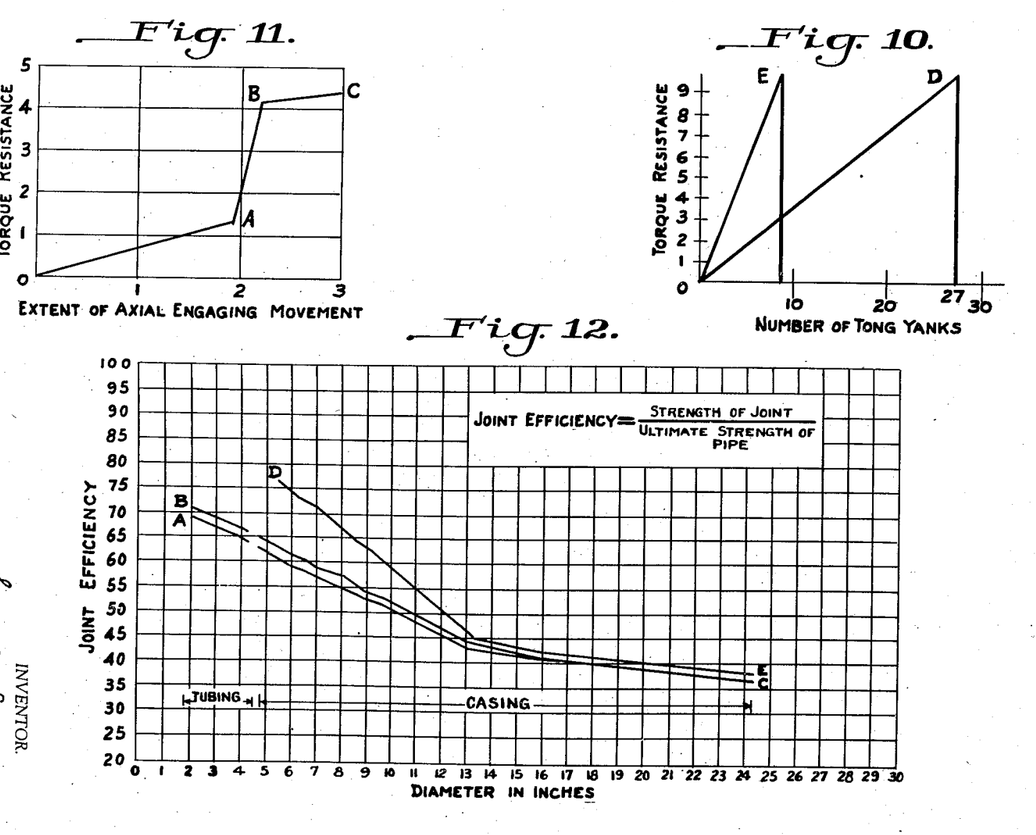
Fig. 10 is a diagram illustrating the work of friction in making up a threaded joint using my invention in comparison with the work of friction in making up the same size A. P. I. standard casing joint.
Fig. 11 is a curve illustrating a general approximation of the frictional resistance to the make-up of a typical pipe joint constructed in accordance with my invention.
Fig. 12 is a graph showing the tensile efficiency of my improved joint and that of the various grades of A. P. I. casing.

A stop or shoulder 22 is provided on the male member which is adapted to abut positively against the end 24 of the female member 10. This very definitely limits the made-up position of the joint and provides a witness mark as a safe-guard against under-tonging with the inherent possibility of joint leakage and likewise substantially prevents over-tonging with its attending dangers of joint galling or over-stressing. Fig. 11 illustrates the curve of a typical make-up of my joint with the ordinate being representative of torque units and the abscissa of fractional mating advancement. Point O of the curve indicates hand-tight position of the joint while the point A is the normal make-up position of the joint with the shoulders abutting. The portion of the curve from A to B represents the torque required to build up on the abutting surfaces 22 and 24 all the pressure which these surfaces can sustain within the elastic limit of the material. The portion from B to C is indeterminate and represents hypothetically the torque required to produce a complete failure of the joint.

A novel feature of my invention is the provision of an improved seal in the joint (see Fig. 8) which includes a cone frustum 30 formed on the end of the male member and extending from point 31 to point 32. Complementary of the sealing surface 30 is a frusto-conical sealing surface 34 on the female member which extends from point 35 to point 36. By providing the clearance 20a at the inner end of the engaged threads, a zone of flexibility is provided between the sealing and threaded surfaces. This permits the small end of the male member to adjust itself radially so that very good alignment can be obtained between the sealing surfaces 30 and 34.

Figure 8:
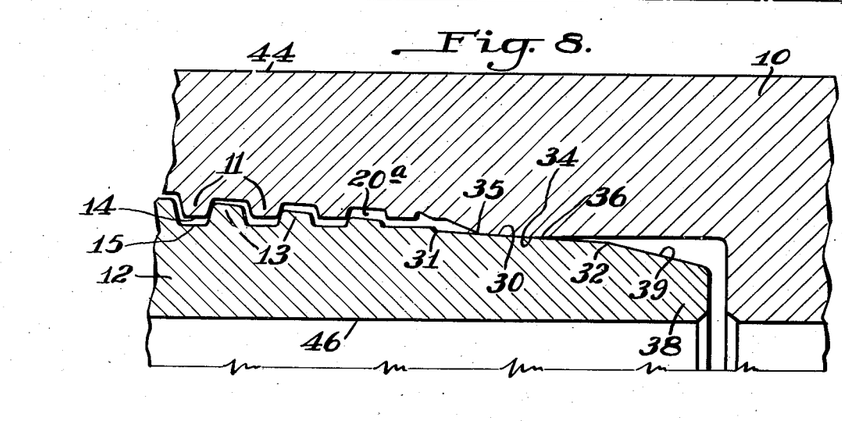
Fig. 8 is an enlarged fragmentary sectional view showing the seal and its related parts.

From the foregoing it will be evident that the sealing surface on the male member is made considerably longer than the sealing surface on the female member. This is an important feature which is embodied in the structure for the following reason: My new type of thread is preferably cut with full length chasers. At the end of the cut these chasers are opened up radially to withdraw them from the work. In pulling the chasers radially out from the cut, slight humps are left by the chasers just as they leave the work. These humps are very slight, but are of unequal height. In making the joint up at or near the hand-tight position, the chaser humps on the male member must be worked past the chaser humps on the female member. This may cause a very slight transient misalignment of the male and female members.

At the instant that this transient misalignment occurs, it is necessary to have the male sealing surface entered well into the female sealing surface, in order that there may be sufficient area of contact between male and female sealing surfaces to correct the transient misalignment noted, without building up on the sealing surface normal pressure sufficient to cause incipient galling. It is, however, essential to have the area of seal engagement in the made-up position small so that adequate normal pressure will exist sufficient to resist leakage. Therefore, as noted above, the male sealing surface is longer than the female sealing surface.

To provide sealing surfaces with the most desirable characteristics, I have found that the taper of the sealing surfaces must be comparatively flat as illustrated and described. While this taper is properly termed relatively flat for sealing surfaces, the same taper for threads, based on prior practice, may be called relatively steep. If the taper of the sealing surfaces is too steep slight relative axial movement between the engaging members will cause the seal surfaces to separate and leaks will occur. Slight axial movement of one member with respect to the other may happen when the members are subjected to heavy axial tension. Also, practical machining tolerances cause a wide variation in the pressure built up between steeply tapered sealing surfaces. Heavy contact pressures cause high stresses in the sealing members and, also, have a tendency to gall the sealing surfaces. Light contact pressures will not permit the seals to resist leakage. With flat tapered sealing surfaces, the variation in make-up due to practical machining tolerances does not cause such a wide variation in pressure between the sealing surfaces. I have found by experiment that the taper of the frusto-conical sealing surfaces is satisfactory if, when the male seal is well lubricated and forced hard axially into the female seal, it will remain there until it is forced out of engagement. I define a taper that meets this requirement as a binding taper. Such a binding taper is provided in my improved joint and this relatively flat taper together with the positive abutting shoulders on my joint insures that within machining tolerances and under operating conditions an effective seal shall be provided.

The small end of the male member is provided with a portion 38 extending somewhat beyond its sealing surface 30, and this performs the dual purpose of assisting in aligning or stabbing operations and providing strengthening metal adjacent the male sealing surface. To further aid in centering the male member in the female member in the stabbing operation and to prevent damaging of the thread and sealing surfaces in this operation, the extending portion 38 of the male member is preferably formed with a frusto-conical area 39 having a taper steeper than that of the sealing surfaces.

The frusto-conical area 39 acts as a kick-over shoulder, during the stabbing operation, to throw the male pipe end into closer axial alignment with the female pipe end thereby protecting the sealing and thread surfaces. The non-engaging projection 38 protects the male sealing surface from accidental damage during handling and transportation. Many blows that would otherwise be taken on the edge of the seal are taken on the projecting nose. It is immaterial if the nose is scratched or scarred because it is non-engaging.

In order to further improve the joint, the male and female members are machined on their inner and outer surfaces as at 44 and 46 concentric to the threaded surfaces to provide uniform wall thickness circumferentially of the joint. Thus the pressures on the threads and on the sealing surfaces are distributed evenly over the entire periphery thereof which results in even pressure without concentration of stresses circumferentially of the joint.

Prior to my invention it has been current practice to cover the engaging female surface of the A. P. I. joint with soft metal, such as cadmium or zinc, which protects and lubricates the surfaces. However, I have found that it is difficult to electroplate the female joint surfaces when they are an integral part of a long length of pipe and that the covering metal flakes off in use, thereby preventing repeated make-up of the joint. I have, however, avoided and overcome the foregoing disadvantages by providing a protective and lubricating coating of metal, preferably zinc, which is sprayed in molten condition on the joint surfaces after a light preparatory sand blasting operation. This coating permits the joint to be made up repeatedly, covers machining marks on the joint surfaces and aids in obtaining more uniform contact of the engaging areas of the joint. The sprayed-on metal is preferably extended from and over the abutting shoulder 22 on the male member, down over the threaded and sealing portions thereof, and on over the tapered kick-over taper 39 on the male member, and over and around the extreme end of the pipe to thereby insure very complete coverage of the male member and protection against corrosion. To guard against a serious reduction of leak resistance by corrosion on the inner cylindrical surface 60 adjacent the male seal, when casing is supplied for wells which are critical from the corrosion standpoint, the invention teaches the spraying on the inside surface of the male end, of any desired metal, as for example stainless steel. Relatively hard metal, such as stainless steel, is preferably employed for this purpose; however, softer protective metals, zinc, cadmium, etc., may also be used within the scope of the invention.

Figure 2:
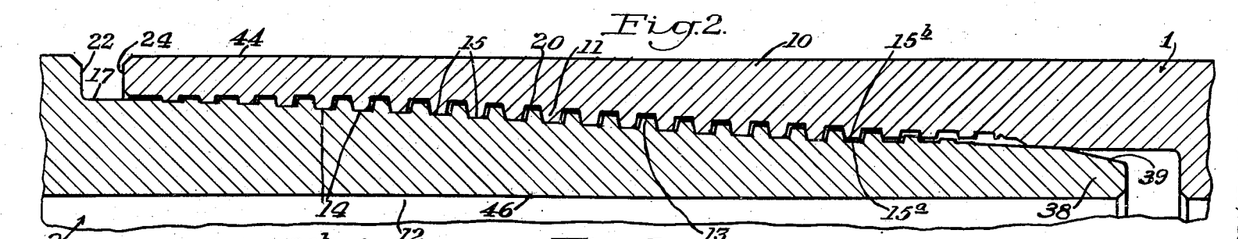
Fig. 2 is a view similar to Fig. 1 but showing the relative positions of the pipe threads when the joint has been screwed to the hand or rope-tight position.

Referring now to Fig. 2 of the drawings, which illustrates the joint in the rope or hand-tight position, it will be recognized that the end 24 of the female member 10 is approaching the shoulder 22 formed on the male member which definitely limits the tightening of the joint. At approximately the same time the cooperating conical sealing surfaces of the small end of the male member and the cooperating portion of the female member have begun to engage.

Figures 3, 4:
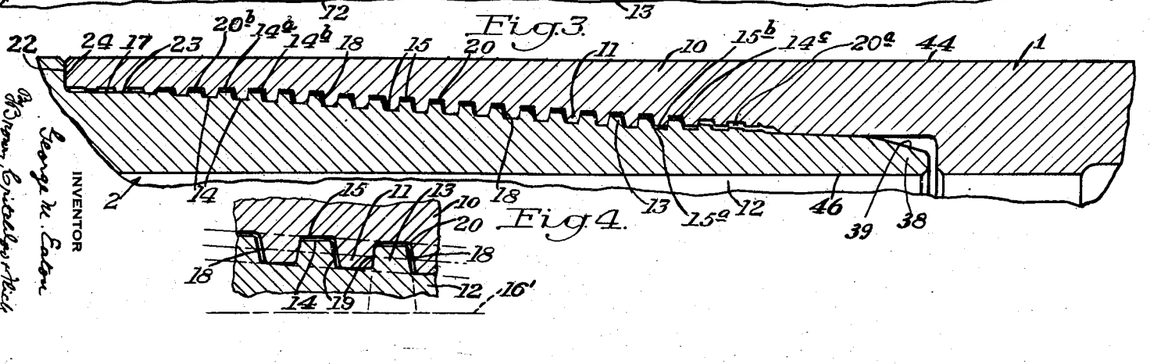
Fig. 3 is a view similar to Fig. 1 but illustrating the relative positions of the complementary threaded sections when the joint is fully made up.
Fig. 4 is an enlarged longitudinal sectional view showing the detail contour of the thread comprising my invention, the threaded members being shown in their fully engaged positions and partly broken away.

Fig. 3 illustrates the joint in its made-up position with the end 24 of the female member positively contacting with the shoulder 22 on the male member which limits further tightening of the joint.

An important feature of the invention consists in forming the complementary threads 11 and 13 in such a manner that the crests of the threads of one threaded member are in hard bottoming contact with the roots of the threads of the other mating member in the made-up position. I prefer to bottom the crests of the female thread in the roots of the male thread. I have found it impractical to bottom the crests of both the male and female threads in the corresponding roots of the mating threads. Manufacturing methods and tolerances are not adaptable to the precision machining involved to insure such a result. Therefore, it is far more practical to gauge the threads for size, etc., when it is necessary to gauge only the roots of the threads of one member and the crests of the other member, instead of gauging the crests and roots of both members. Therefore, I provide clearance, preferably between the roots of the female threads and the crests of the male threads.

I prefer to bottom in the roots of the male threads because when this is done, both the mating roots and crests are automatically protected from damage by their physical shape. The crests of the male threads are more exposed to damage than any other part of the thread, but if they are damaged no harm is done since they do not come into intimate contact with the female roots. The crests of the female members being located inside the pipe are automatically protected from damage. This construction is also preferable, because if an attempt were made to bottom the male crests in the female roots, the mating surfaces at the large end of the thread would be cylindrical, and if hard bottoming existed on these cylindrical surfaces, galling would be practically certain to occur as the joint is forced home to its made-up position. This selected bottoming which I have just described is well adapted to the thread form which I employ in my preferred structure. The crests and roots are broad and flat and withstand heavy radial make-up pressure. The tools which cut this thread have broad cutting edges which wear slowly as compared with the sharp pointed tools used in cutting the A. P. I. casing thread form. As the points wear off from the tips of the A. P. I. thread cutting tools, the roots cut by these tips in the work are not as deep as they should be.

The crests of the A. P. I. casing threads are liable to be sharper than the roots. This causes hard tip-to-root binding with a definite tendency for galling. Due to the shape of my thread and the clearances provided, the galling tendency is practically eliminated.

I have moreover discovered that the reliability of my improved thread is definitely increased by making each thread definitely narrower in width than the space between the threads. This space, shown in the drawings by the numeral 18, is in excess of any possible accumulative error of machining within tolerances. By providing definite clearances of this character, I have also found that galling is substantially eliminated, in that excess material in the threads has a distinct place to flow, and, in addition, any foreign material trapped in the joint does not cause difficulty in the making-up operation.

The particular angle that the flanks 19 of the threads make with the axis of the joint is important in that if this angle is too great machining difficulties present themselves, and if it is too small the female joint member expands and the male member contracts during axial tension force applications. Incipient female expansion and male contraction may result in either joint leakage or failure. Amplifying this, by reference to the angle of repose, when a body rests on an inclined plane it is held from sliding down the inclined plane by the forces of friction, and when the angle that the inclined plane makes with the horizontal plane is gradually increased, an angle is finally reached at which the body begins to slide down the plane. The greatest value of this angle at which sliding will not start is termed the angle of repose.

It will be recognized that in the joint construction the flanks or sides 19 of the mating threads form really inclined planes to each other when forces are exerted in axial directions upon the pipe structure. Of course, the closer the angle between the thread side or flank 19 and the longitudinal axis 16' is to 90°, the less chance of relative sliding movement between the threads and the less radial strain on the mating sections. I have found that an angle not less than about 80° to the axis, and preferably in the neighborhood of about 84°, is a practical angle for making the thread flanks, and that this angle does not exceed the angle of repose of the metal from which my joint is generally made when lubricated in the usual manner. This preferred angle can be readily cut by either a full-length chaser or a hob, but preferably the operation is performed by the full-length chaser as there is insufficient body metal to hold the relatively thin joint members circular during the radial pressure existing during the hobbing cut.

With an angle of approximately 84° between the joint axis and the flank of the thread, the flank is not extremely smooth. However, drastic tests have proven that completely smooth flanks are unnecessary with my type of thread since no heavy pressure is exerted on the thread flanks until after the female pipe end 24 has abutted with the shoulder 22 on the male member with the joint in the fully made-up position. The definite clearance 18 between one side only of the flanks of the threads when the joint is in the made-up position, is best illustrated in Fig. 4.

The telescopic engagement, of the complementary members of my joint, is limited by the abutting shoulders 22 and 24 to control the radial pressure set up between the members when the joint is fully made up, which limited radial pressure is not great enough to produce stresses materially exceeding the elastic limit of the metal of the members.

From the foregoing it will be recognized that my improved thread can be made with smooth run-outs or machining on the threaded members. This avoids the forming of feather edges which sometimes occur in the A. P. I. casing thread, and which are in that thread, very occasionally, a source of galling that may result in the failure of the A. P. I. joint. Moreover, the grooves of the A. P. I. thread are very difficult to properly machine so that the exact engaging forces of the complementary threads can be controlled. Thus, my joint results in a distinct improvement due to the absence of uncontrolled radial forces, and due also to the fact that use of trapezoidal threads rather than V threads avoids concentrated stresses in the bottoms or roots of the threads.

I avoid this stress concentration to which the A. P. I. thread is subject, by the smooth run-out or vanishing of my complementary threads. It is the current practice, however, in the A. P. I. thread to chamfer where the threads start to vanish. This necessitates machining operations which also often result in feather edges with their inherent danger of galling. Moreover, the standard A. P. I. sharp V threads are extremely susceptible to accidental damage. This is a serious defect in that a very small deformation will cause a galled thread because there is practically no escape for the displaced metal during make-up of the joint.

My thread, however, resists accidental damage far more effectively since it has no sharp edges and, furthermore, because even if some metal is displaced on my thread, no galling action will occur due to the liberal thread clearances, as heretofore described, in which displaced metal can escape. I have found also that with the clearances existing in my thread not only do the normal threads go together with a reliable freedom from galling, but a surprising amount of foreign material such as dirt, etc., can also be disposed of in these clearances without impairing the joint.

It is evident that in a threaded pipe connection the shallower thread is made the greater the thickness and strength of metal backing up the thread will be. I have proven by actual pulling tests that with male threads .050 inch high I secure a tensional strength with my joint greatly in excess of that of A. P. I. casing threads whose height is .080 inch. Similarly, I secure in larger casing sizes with a thread height of .075 inch greater strength than exists in A. P. I. casing joints with a thread height of .100 inch.

As mentioned briefly heretofore, my improved joint has been particularly designed to improve the ease with which the casing can be joined together, and this functions to reduce the amount of time required by the well driller in assembling his casing. Thus, the steeper taper, the shallower threads, the way the threads vanish, and the clearance between the over-all end diameter of the male member and the inside diameter of the female end, are so much more favorable than the corresponding A. P. I. dimensions that stabbing of the pipe sections together can be accomplished in less time. Also, the automatic meshing of the threads during the stabbing operation, to which reference has been made, eliminates the use of hand tongs for performing this operation with a further saving of time.

The steep taper and the shallow threads combine to locate the male end deeply telescoped into the female member in the stabbed position. This also insures an overlapping of at least approximately 50% of the threads before they engage each other, which provides a very positive initial engagement of the flank surfaces of a relatively large number of threads. It has been found that this surface engagement in the stabbed position is so large and so strong that it is possible to jam the mating pipes together with very considerable force without damage to the threads.

For example, during a casing operation the female end of the pipe is ordinarily turned vertically upwards and receives the male end of the next casing section. I have found that a new length of casing ordinarily weighing on an average over a thousand pounds can be stood on the female end of the casing already in a drill hole and then the male end of the pipe can be pushed off the end of the female member and the whole pipe can drop inches to bring the male and female portions into the stabbed position. This very severe test has been tried on numerous occasions with my improved thread without ever resulting in damage to the threads which would produce galling.

Returning now to the saving in time and labor in assembling my improved joint, it will be recognized that the overlap of the threads, as above referred to, means that only a very few number of turns of the pipe sections from the stabbed position to rope-tight or hand-tight position is required. Likewise, only a small number of turns is required to tighten the joint from the hand or rope-tight position to the fully made-up position.

Moreover, with my improved joint another advantage is inherent, namely, that the torque resistance to making up the pipe joint increases at a rapid uniform rate so that the total work done on the joint is materially less than that formerly required on the A. P. I. joint, for example. To better illustrate this comparison, reference may be had to Fig. 10 in which torque units are plotted on the vertical ordinate, and the number of tong yanks is plotted on the horizontal abscissa. The area O—27—D is the work of friction required for a typical A. P. I. joint, in which twenty-seven yanks of the tongs were required to fully make up the joint. On the other hand, the area O—9—E illustrates the work of friction for making up my joint in the same size where only nine yanks were required on a typical pipe. It will be seen from Fig. 10 therefore, that only approximately one-third of the work is required to make up my improved joint when compared with the work required to make up an A. P. I. joint. These figures are based upon making up 7-inch casing joints, although similar figures could be obtained for substantially any sizes.

In addition to saving time on making up my joint, and also saving actual energy put into making up the joint, it is to be noted that, with other things being equal, the chance of galling the joint during the act of make-up is a direct function of the work of friction. My joint is therefore triply immune from galling for the following reasons: (a) less work of friction to produce galling; (b) less chance for galling to start; and (c) less chance for incipient galling to be sustained or accelerated. As a corollary to the immunity from galling, is the fact that my joint can be opened and remade repeatedly due to the freedom from surface destruction.

It might be well also to mention that my improved joint is advantageous because of the very few precision requirements of my threads, and because of the relatively small number of actually contacting surfaces in the joint. Thus, substantially all the requirements are taper, and diameter, and that the crests, roots, and sealing surfaces are smooth where in contact in the making up of or in the made-up joint. These are much fewer than the precision machining requirements of the A. P. I. casing threads discussed above with reference to prior art practices.

My invention likewise includes the provision of a new and novel method for producing well casing joints of the character just described, wherein the efficiency of the joint (defined by percentage ratio of strength of joint divided by ultimate strength of pipe) is very completely controlled and may be made as desired.

Figure 13:
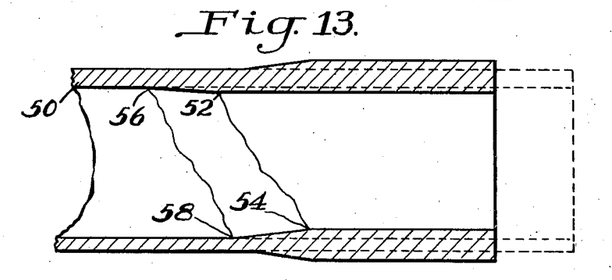
Fig. 13 is a longitudinal, diametrical, cross sectional view of a pipe end which has been upset both externally and internally in accordance with the principles of the invention.

Referring to Figs. 13 to 15 for a better understanding of one manner in which my new method can be practiced, the numeral 50 indicates a pipe end, which pipe, in accordance with well casing standards, is seamless. However with seamless tubing and pipe, the wall thickness is very apt to be non-uniform (as exaggerated in the drawings) and the inner and outer surfaces may not be concentric. Thus when the pipe end is upset from the dotted to the full line position seen in Fig. 13, the runout 52—54 of the interior upset and the runout 56—58 into the pipe wall are in substantially all cases irregular as shown.

Figure 14:
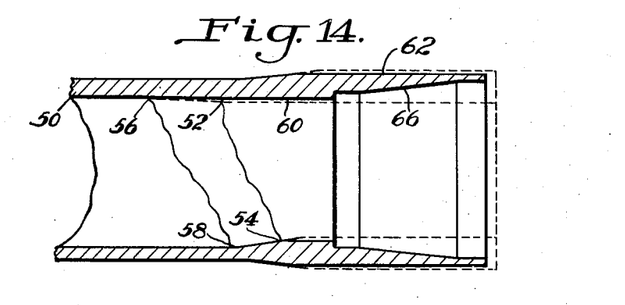
Fig. 14 is a longitudinal sectional view of an upset pipe end, similar to Fig. 13, which has been machined preparatory to being formed with female threads and sealing surfaces.
Figure 15:
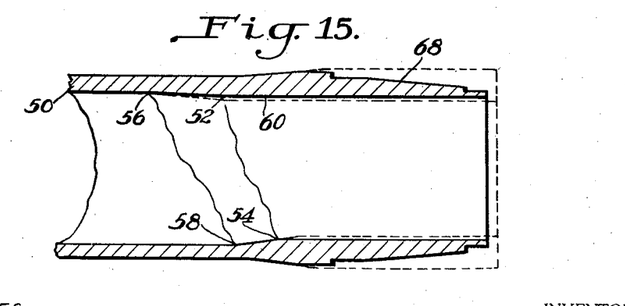
Fig. 15 is a longitudinal sectional view of an upset pipe end, similar to Fig. 13, with the upset end machined preparatory to being formed with male threads and sealing surfaces.

Accordingly in either the formation of the male or female mating portions on the upset end, I machine the interior upset portion down to the surface 60. This and all other machining operations are performed while holding the pipe in an unchanged chuck grip on the outer surface of the pipe, thus insuring that the surface 60 will be concentric therewith. With this machining operation the runout line 52—54 will move toward the runout line 56—58 as seen in Figs. 14 and 15. I next machine the outer portion of the upset down to the surface 62 and thereby insure concentricity between the surfaces 60 and 62.

An important feature of my invention is to remove all metal from the surface of the upset which has been decarburized in any of the manufacturing steps up to machining. Thus the machining operations, to form surfaces 60 and 62, are carefully controlled to provide concentricity, and the desired wall thickness, and to remove the decarburized surface metal thereby leaving the stronger base stock.

As illustrated in Figs. 14 and 15, the machined upset portions are now further machined to form either a female surface 66 or a male surface 68. These surfaces 66 and 68 then are provided with complementary threads and sealing surfaces, as for example, of the character described heretofore to complete the joint.

It will be appreciated that the various steps in my improved method can be correlated and controlled so that any desired joint efficiency may be attained regardless of the size of the pipe. This is directly contrary to the teaching of the prior art and practices where with the joints being formed on the pipe ends of the same wall thickness as the pipe itself, or otherwise, it was impossible to obtain high efficiency or uniform efficiency for joints in a line of casing covering a plurality of sizes. With my inventon I can attain high joint efficiency and can make this efficiency uniform over the various sizes of casing.

For example, Fig. 12 shows a graph plotting joint efficiency on its ordinate and casing size on its abscissa. The lines A—C, B—C, and D—E illustrate results of all grades of A. P. I. casing, with the joint efficiencies being relatively low even in small sizes and rapidly falling away in larger sizes. This means that the joints will yield under much lower tensile stresses than will cause failure of the casing bodies proper, so that often it is impossible to remove a casing from its well or to carry more than a certain weight of casings in a well. As directly distinguished from prior art failures, I provide a joint which can be made of uniform, high efficiency regardless of casing diameter.

A novel and important feature of the invention is that with my new method of forming joints, the external diameter of the joint can be kept at a minimum and the internal diameter at a maximum. These dimensions are crucial in well casing, as by the reduction of outside joint dimensions, while maintaining inside joint clearances, I am able to start the well with a smaller hole than is possible when using A. P. I. casing. This saves the cost of drill bits, reduces the amount of material that has to be pulverized and raised to the surface and reduces the total casing weight. All these factors mean tremendous savings.

As a concrete illustration of the relative outside diameters and tensile strengths of my joint and the standard A. P. I. coupling I give the following tabulation showing joints which have actually been made and tested:

| Pipe size | Outside diameter | | | Tensile efficiency of joint | | |
|---|---|---|---|---|---|---|
| | A | B | A-B | A | B | B/A |
| | A. P. I. coupling | My new joint | Reduction | A. P. I. | My new joint | Improvement |
| 5½ | 6.050 | 5.916 | .134 | Short cplg. 61.5% Long cplg. | Percent 100 | 1.63 |
| 7 | 7.750 | 7.308 | .442 | 71.0% Long cplg. | 86 | 1.21 |
| 7⅝ | 8.500 | 7.930 | .570 | 68% | 86.7 | 1.27 |

It should be understood that in accordance with the invention the outer and inner surfaces 60 and 62 after machining, will run out on approximate streamlined contours into the body proper of the pipe. This reduces the resistance to movement of the casing into and out of the well and permits non-turbulent flow of cement up around the outside of the casing and likewise allows more ready passage of materials through the interior of the joints.

As heretofore discussed in greater detail, my improved method of making a well casing joint insures circumferential uniformity of the metal backing the mating thread and sealing portions on my joint. This results in very even stresses over the entire joint surfaces, and prevents joint failure from stress concentration as occurred in prior known practices. Likewise the external and internal diameters can be controlled within close limits.

I have proven by exhaustive tests and by actual service in oil wells on a variety of sizes that a joint manufactured according to my invention fulfills the objects hereinbefore set forth.

While in accordance with the patent statutes one embodiment of the principles of the invention has been illustrated and described in detail, it will be understood that the invention is not limited thereto or thereby, but is defined in the appended claims.

I claim:

1. A threaded connection for male and female tubular metallic members including tapered threaded portions arranged to be engaged and wherein substantially all the threads have flat crests and roots which are parallel with the axes of the members.

2. A threaded connection for male and female tubular metallic members including tapered threaded portions arranged to be engaged and wherein the bottoming threads have flat crests and roots which are parallel with the axes of the members and wherein the flanks of the threads are disposed relative to the axes of the members within the angle of repose of the flank surfaces.

3. A threaded connection for male and female metallic tubular members including tapered threaded portions arranged to be engaged and wherein the threads have flat crests and roots which are parallel with the axes of the members, the crests of the threads of one member only bottoming in the roots of the threads of the other member.

4. A threaded connection for male and female metallic tubular members including tapered threaded portions arranged to be engaged and wherein the thread crests and roots defined by lines parallel to the joint taper are parallel with the axes of the members, there being axial clearance between the adjacent flanks of engaged threads.

5. A threaded connection for male and female tubular members comprising tapered threaded portions arranged to be engaged with the roots of one thread vanishing into a cylindrical surface and the crests of the other thread being in diminishing bearing engagement with the cylindrical surface.

6. A threaded connection for male and female metallic tubular members including tapered threaded portions arranged to be engaged and wherein substantially all the threads have flat crests and roots parallel with the axes of the members, the crests of the male threads adjacent the larger end of its threaded portion lying on a cylinder and the corresponding roots of the female thread lying on a cylinder of slightly greater diameter, the roots of the threads of the male member adjacent the large end of its threaded portion vanishing onto a cylindrical surface and the crests of the threads of the female member being in diminishing load-bearing engagement with a part of said cylindrical surface beyond the point where the male roots vanish onto the cylindrical surface thus reducing stress concentration.

7. A threaded connection for male and female metallic tubular members including tapered threaded portions arranged to be engaged and wherein the threads have approximately flat crests and roots substantially parallel with the axes of the members, the crests of the female threads being in substantially hard engagement with the corresponding roots of the male threads substantially throughout the threaded portions.

8. A threaded connection for male and female metallic tubular members including tapered threaded portions arranged to be engaged and wherein substantially all the threads have flat crests and roots parallel with the axes of the members, the crests of the male thread adjacent the outer end of its threaded section being defined by a cone whose taper is steeper than the taper of the thread.

9. A joint including a male member having a tapered threaded portion, the crests of the perfect threads from the small end of the portion to beyond the middle of the portion being defined by a line parallel to the taper and from there to the large end by a line parallel to the joint axes, and the roots of the threads from the large end of the threaded portion to beyond the middle being defined by a line parallel to the taper and from there by a line parallel to the joint axis, and a female member having a complementary threaded portion.

10. A joint including a male member having a tapered threaded portion, the crests of the threads from the small end of the portion to beyond the middle of the portion being defined by a line parallel to the taper and from there to the large end by a line parallel to the joint axis, and the roots of the threads from the large end of the threaded portion to beyond the middle being defined by a line parallel to the taper and from there by a line parallel to the coupling axis, the roots and crests of the threads being substantially parallel to the joint axis, and a female member having a complementary threaded portion.

11. A threaded connection for tubular members including complementary threaded portions and frusto-conical sealing portions arranged to be engaged, and a non-engaging extension of material length forming the extremity of the male member whereby to increase the normal pressure between said sealing portions.

12. A threaded connection for tubular members comprising complementary threaded portions arranged to be engaged, a sealing surface on one member, and a mating sealing surface on the other member, one of said surfaces being materially longer than the other.

13. A joint for well casing or the like comprising complementary male and female members having tapered complementary portions threaded with trapezoidal threads, the crests of approximately all the threads being substantially flat and parallel with the axes of the members whereby stabbing of the members together can be achieved without galling of the threads.

GEORGE M. EATON.